United States Patent [19]
Yishay et al.

[11] Patent Number: 5,548,794
[45] Date of Patent: Aug. 20, 1996

[54] DATA PROCESSOR AND METHOD FOR PROVIDING SHOW CYCLES ON A FAST MULTIPLEXED BUS

[75] Inventors: Oded Yishay; Joseph Jelemensky; Alexander L. Iles, all of Austin, Tex.

[73] Assignee: Motorola, Inc., Schaumburg, Ill.

[21] Appl. No.: 349,286

[22] Filed: Dec. 5, 1994

[51] Int. Cl.$^6$ .............................. G06F 13/40; G06F 9/34
[52] U.S. Cl. .............. 395/871; 395/421.01; 395/421.04; 364/DIG. 1; 364/DIG. 2
[58] Field of Search .................................. 395/800, 473, 395/733, 842, 479, 421.08, 455, 411, 421.04, 421.01, 462, 427, 465, 375, 871, 185.06; 364/DIG. 1, DIG. 2; 382/303; 371/37.3; 340/825.5; 370/85.6

[56] References Cited

U.S. PATENT DOCUMENTS

| | | | |
|---|---|---|---|
| 4,414,664 | 11/1983 | Greenwood | 371/37.3 |
| 4,489,380 | 12/1984 | Carey et al. | 395/479 |
| 4,665,481 | 5/1987 | Stonier et al. | 395/842 |
| 4,860,375 | 8/1989 | McCubbrey et al. | 382/303 |
| 5,339,399 | 8/1994 | Lee et al. | 395/473 |

*Primary Examiner*—Daniel H. Pan
*Attorney, Agent, or Firm*—Elizabeth A. Apperley

[57] ABSTRACT

A data processor (10) and method which provides show-cycles on a fast multiplexed bus (28) using two distinct modes of operation. A first mode of operation supports a standard show-cycle on a multiplexed bus for interface to a passive device such as a logic analyzer (100). A second mode of operation supports emulation tools (100) with real-time tracking of control functions using a multiplexed bus. During each of the modes of operation of the data processor (10), both read and write show cycles are supported and are consistently provided in a similar format.

34 Claims, 8 Drawing Sheets

DATA PROCESSOR AND METHOD FOR PROVIDING SHOW CYCLES ON A FAST MULTIPLEXED BUS

CROSS-REFERENCE TO A RELATED APPLICATION

This application is related to our commonly assigned copending patent application entitled:

"Integrated Circuit Data Processor Which Provides External Sensibility of Internal Signals During Reset" by Alexander L. Iles, Joseph Jelemensky, and Oded Yishay, U.S. application Ser. No. 08/333,658 and filed Oct. 31, 1994.

FIELD OF THE INVENTION

The present invention relates to a data processor having show cycles, in general and more particularly to a data processor which provides show cycles on a multiplexed bus.

BACKGROUND OF THE INVENTION

Many microcontroller applications involve bus operations which occur entirely within a microcontroller unit (MCU). Such bus operations include read and write operations of internal control registers, internal data registers, and on-chip memory. Such operations are generally not visible to a device external to the microcontroller. However, in a development environment, observability of these internal operations is often required.

Generally, an external bus circuit within the microcontroller unit provides an interface between a fast internal bus of the microcontroller unit and devices external to the microcontroller unit. The external bus circuit is also responsible for external bus management and for accessing the internal bus to multiplex address and data signals on the same integrated circuit terminals at different times during a bus operation. By multiplexing address and data signals on the same integrated circuit terminals, the external bus circuit may reduce a total integrated circuit terminal count of the microcontroller unit and, therefore, provide a low cost data processor.

An attractive feature of the external bus circuit is its ability to enable the microcontroller unit to have a low terminal count. The cost can be drastically affected via the elimination of the data bus terminals. Therefore, all external bus cycles, including show cycles, may be required to use a multiplexed bus interface.

In a development environment, the external bus circuit is also responsible for providing external visibility of internal bus cycles. This is provided to support both passive tools such as logic analyzers and bus analyzers and active tools which require tracking of internal control operations in real time. The mechanism for providing external visibility of internal bus cycles is referred to as a show-cycle and requires a different data bus timing from a standard external bus cycle. In general, the address phase of the show-cycle is similar to a standard external bus cycle wherein a data phase is delayed. The data phase is delayed because valid data from an internal read cycle cannot be driven externally until it is valid internally within the microcontroller unit. The data is not valid internally within the microcontroller until the end of the external bus cycle. Then, there is a delay while the external bus circuit drives data externally. Therefore, the data phase of a standard show read cycle is not provided until the very end of a current bus cycle and actually protrudes into a following bus cycle.

A conventional show cycle mechanism provides show-cycles on a non-multiplexed bus. The conventional show cycle mechanism provides extension of the data phase of a bus cycle into a following bus cycle. In the following bus cycle, a data phase had not begun and the integrated circuit data terminals may be reused until a start of the data phase begins. However, in the case of a multiplexed bus, the following bus cycle requires the use of the same address/data bus integrated circuit terminals to perform an address phase. There is no room in time for the data phase extension of the show cycle. By the time data retrieved during an internal read operation would be valid on the external integrated circuit terminals of the multiplexed bus of the microcontroller, an address from a following bus cycle will be present on the same integrated circuit terminals. In the multiplexed bus example described above, the conventional sequence of a show cycle is inappropriate in this situation. In an emulation mode of operation, the external bus circuit must also provide real time visibility of internal write operations to support external development tools which control synchronization to internal functions.

Show cycles have been used in data processors for years. However, the show-cycles in such data processors are typically provided on a non-multiplexed bus. The conventional show cycle mechanism provides extension of the data phase of a bus cycle into a following bus cycle, for which a data phase of the following bus cycle has not yet begun. Therefore, the integrated circuit data terminals may be reused until the data phase begins. As data processors provide more and more density of function, there is less need for a non-multiplexed external bus. However, due to the physical requirements of the show cycle and due to the physical restraints of the multiplexed address/data bus, current technology cannot provide internal data during the same external bus cycle as the internal cycle.

Additionally, the emulation cycle is used to track the control of internal functions of a data processor through the use of external shadow registers. Some control signals are decoded concurrently with the latched address phase of the multiplexed bus cycle to generate the address of the shadow register. The shadow register is associated with an external synthesis circuit which requires real-time visibility of control changes in order to remain synchronous with internal data processing functions. Typical development tools will exploit this feature to support several individual functions. Each of the functions exhibits the same basic architecture of a shadow register and provides real-time duplication of an internal register which controls an external function that must track the behavior of an internal function in real time. These functions are reliant upon the emulation cycle's provision of internal write visibility in real time.

SUMMARY OF THE INVENTION

The previously mentioned needs are fulfilled with the present invention. Accordingly, there is provided, in a first form, a data processor which includes a central processing unit for providing a plurality of control signals, a plurality of address values, and a plurality of data values. A system integration circuit is connected to the data processor for receiving the plurality of control signals, the plurality of address values, and the plurality of data values. The system integration circuit generates a first control signal enabling the data processor to execute a show cycle. The system integration circuit provides the plurality of address values and the plurality of data values in a first predetermined format on a multiplexed bus when the first one of the plurality of control signals indicates the data processor is executing the show cycle. The first predetermined format includes a first one of the plurality of data values which is associated with a first address value and is accessed during a first bus cycles. The system integration circuit provides the first one of the plurality of data values to the multiplexed bus during a second cycle in which a second one of the plurality of address values is provided to the multiplexed bus.

In a second embodiment of the present invention, there is provided, a method for providing a show cycle on a multiplexed bus of a data processor. The method includes the steps of enabling the central processing unit of the data processor to provide a plurality of address values, a plurality of data values, and a plurality of control signals and enabling a system integration circuit to generate a first control signal for enabling the data processor to execute the show cycle. The system integration circuit provides the plurality of address values and the plurality of data values in a first predetermined format on the multiplexed bus when the first one of the plurality of control signals enable the data processor to execute the show cycle. The first predetermined format includes a first one of the plurality of data values which is associated with a first address and which is accessed during a first bus cycle. The system integration circuit provides the first of the plurality of data values on the multiplexed bus during a second cycle in which a second one of the plurality of address values is provided to the multiplexed bus.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

Figure 1:
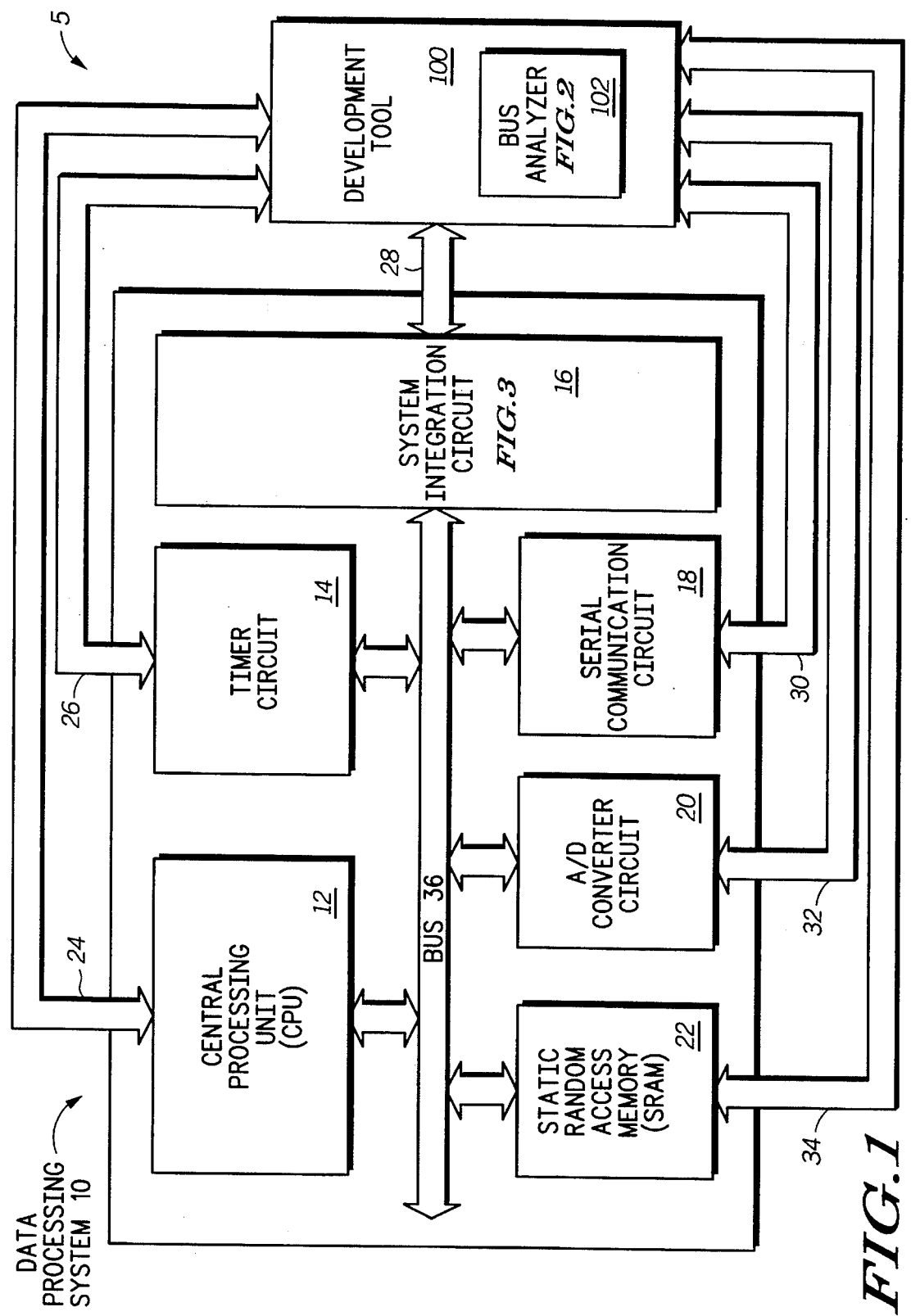
FIG. 1 illustrates a development system in accordance with the present invention.

In general, a full feature development tool such as an in-circuit-emulation system (ICE) must operate a microcontroller in a mode which provides maximum visibility of the microcontroller's internal operations. This allows the tool to provide analysis of program and system behavior of the microcontroller during development of an application. Often, in order to achieve this visibility, the development tool must configure microcontroller resources differently than the application would normally require. In this situation, the tool must replace all functions required by the application which have been affected by the different microcontroller resource configuration. The emulation system should provide an exact reproduction of all functions affected by the modified resource configuration. It is of equal importance that the microcontroller provide the support necessary for the emulation system to correctly synthesize such functions.

Typically, the microcontroller supports a development tool by remapping internal control registers of chip resources internal to the microcontroller which have been affected when the microcontroller is configured to support visibility and controllability of on-chip resources to an external device. The associated on-chip resource is shut down, and the microcontroller operates with the resource implemented off-chip by the emulation system. This is called an emulated resource or function. Most emulated functions exhibit time-sensitive behavior, in which changes to the function occur in a specific time during the bus cycle that alters the control of the function. This requires that the microcontroller support the externally emulated resource in real time and that any changes to the externally mapped emulated resource or function, will concurrently occur. Such concurrent operation simulates a manner in which the operation would have occurred if the registers were mapped internally in a normal operation.

There are also situations in which an on-chip resource has an input/output integrated circuit terminal which has been reassigned to support an emulation mode. The input/output integrated circuit terminal may be linked to another on-chip resource which also performs input/output communication functions and whose external system behavior requires a companion input/output communication function of a replaced integrated circuit terminal. In this case, the emulation system must externally provide a properly synchronized reproduction of the function whose input/output integrated circuit terminal has been replaced. This same function continues to operate internally within the microcontroller and is synchronized to another internal, yet externally visible function. Emulation of this type of synchronous behavior is reliant upon real-time visibility of control operations which affect the behavior of such functions.

The present invention provides a data processor and method which provides show-cycles on a fast multiplexed bus. The present invention provides two distinct modes of operation. A first mode of operation supports a standard show-cycle on a multiplexed bus for interface to a passive device such as a logic analyzer. A second mode of operation supports emulation tools with real-time tracking of control functions using a multiplexed bus. The first mode of operation is generally used to debug both software and hardware of data processing systems with the aid of a low cost microcontroller interface tool and a timing analyzer. The second mode of operation is used primarily in the debugging of firmware using an in-circuit-emulation system which provides a bus analyzer and various other system analysis features.

During operation, a standard fast multiplexed bus show cycle externally provides address information during a normal period of the multiplexed cycle, but borrows a period in time from a following show cycle or external cycle for display of data information. This borrowed period is located in time between the address and data phases of a bus cycle following the show cycle. For example, let's assume the address signal of the first cycle is A1, the data signal of the first cycle is D1, the address signal of the second cycle is A2, the data signal of the second cycle is D2. The data of previous show-cycle is Dx. Two consecutive conventional multiplexed bus cycles would exhibit a sequence, A1-D1-A2-D2. However, a show cycle followed by a standard external cycle on a multiplexed bus would exhibit a sequence A1-Dx-A2-D1-D2.

Figure 7:
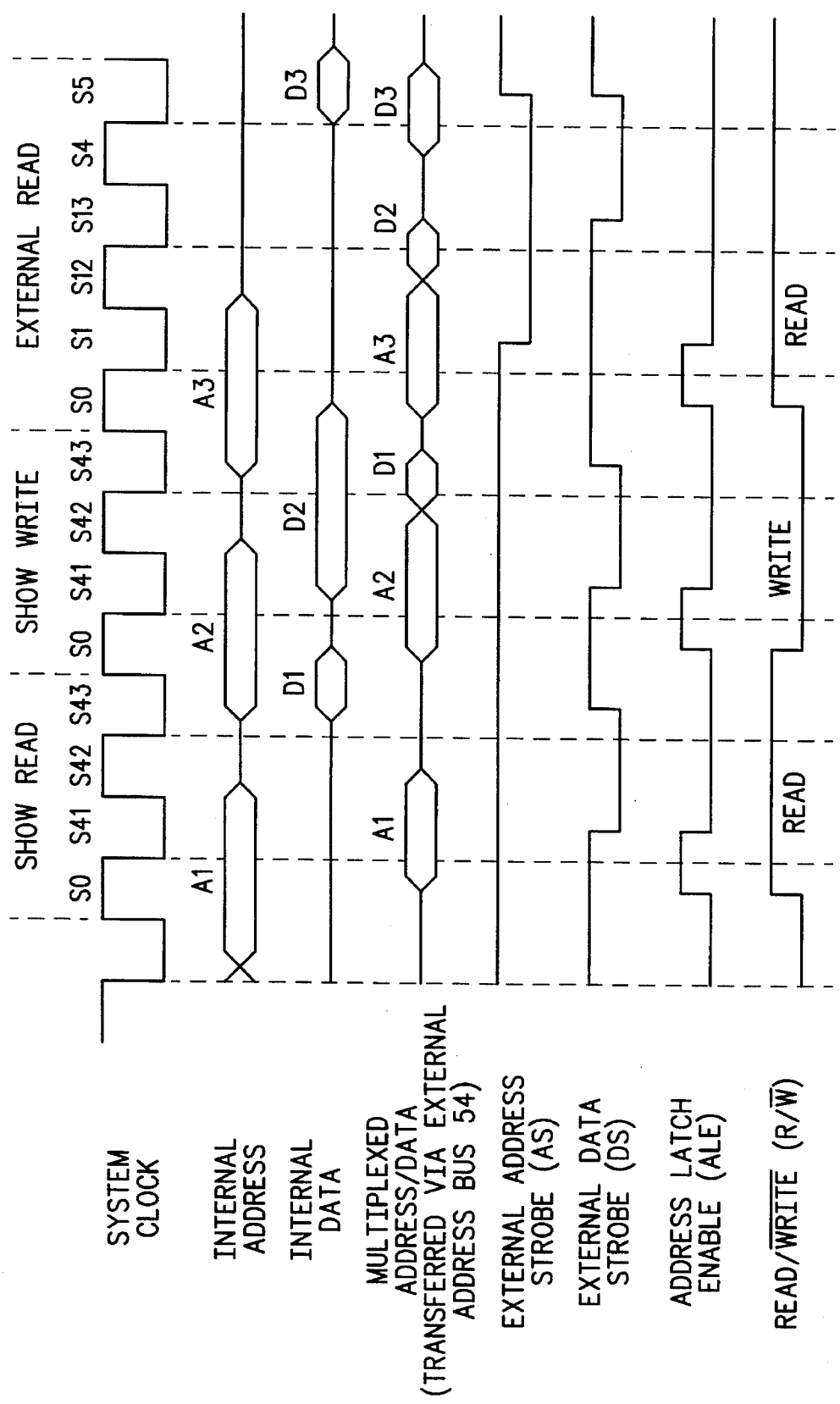
FIG. 7 illustrates a first timing diagram indicating a first mode of operation.

During operation of the present invention, a show cycle is indicated by an address strobe (AS) signal being negated during the assertion of a data strobe (DS) signal. Both the AS and DS signals can be easily identified by an external analysis tool. A key feature of the present embodiment of the invention is consistency between both read and write show cycles such that external logic analysis tools are only required to decode a single show cycle timing and order sequence. The external bus or logic analysis tool must provide a simple pipeline mechanism capable of latching of the address bus until its associated data phase, after which the re-synchronized address and data can be associated together in a data frame. The timing diagram of FIG. 7 illustrates the show cycle timing in more detail.

In the present invention, an emulation mode of a data processor also supports two-clock multiplexed read and write bus cycles. These two-clock multiplexed read and write bus cycles are supported when the data processor is in an emulation mode of operation. Thus, the timing of the data phase of a show cycle in emulation mode that is inserted in the following bus cycle is different from the timing of the data phase of a show cycle in normal mode. Additionally, the emulation show cycle supports real-time observability of internal control operations. Real-time observability of internal control operations is required when external observation of an operation must occur concurrently with the internal operation. This is of particular importance in the case of a write cycle where an emulation show cycle is followed by a standard external cycle on a multiplexed bus. Such a case would exhibit the sequence A1-Dx-D1-A2-D1-D2. This is accompanied by assertion of an emulation chip select signal which indicates that the current bus cycle is an emulation show cycle.

Figure 8:
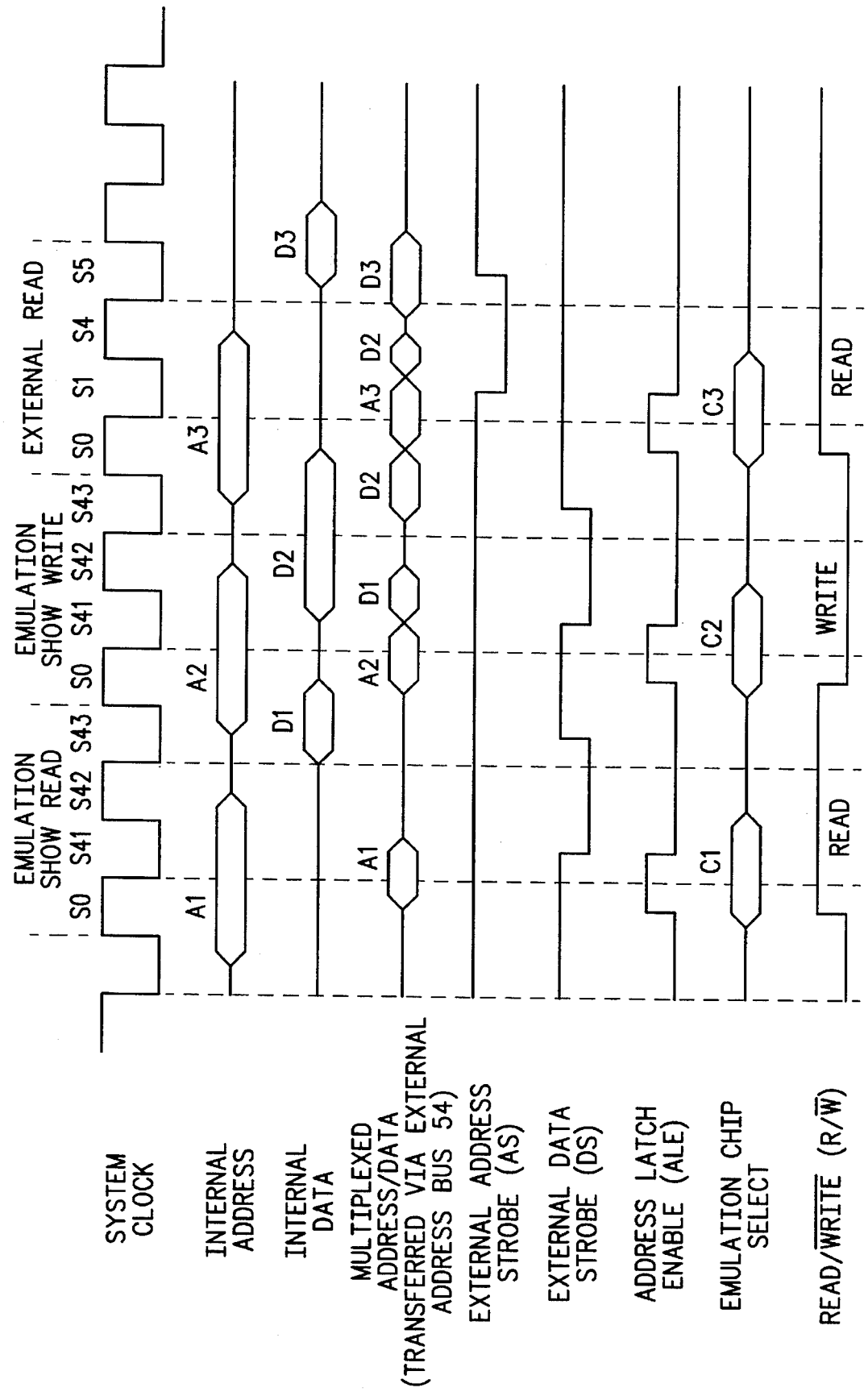
FIG. 8 illustrates a second timing diagram indicating a second mode of operation.
Figure 9:
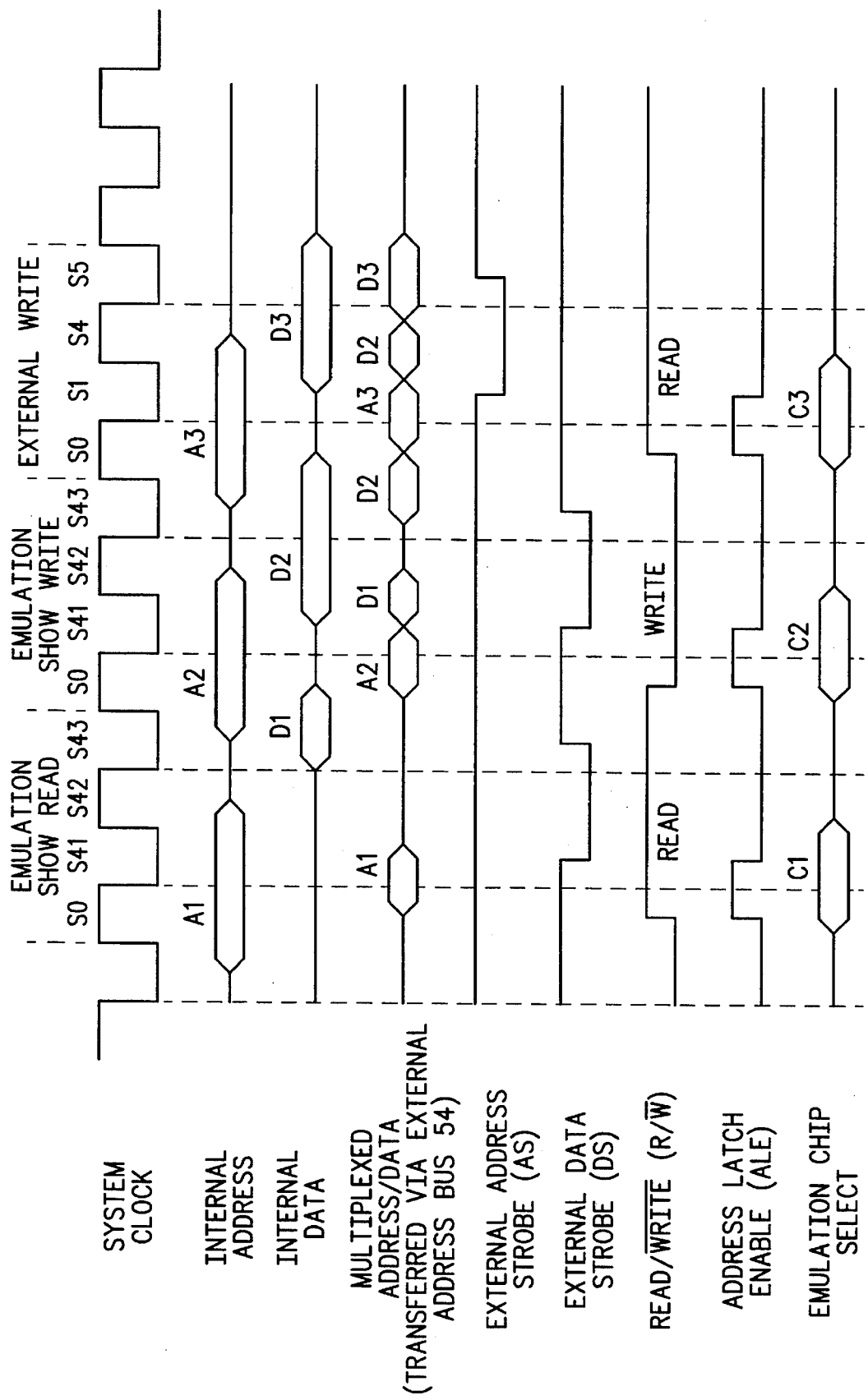
FIG. 9 illustrates a third timing diagram indicating a plurality of signals generated during a third mode of operation.

In the present embodiment of the invention, logic or bus analysis tools may be able to synchronize to the emulation show cycles as previously described. The timing diagrams of FIGS. 8 and 9 illustrate the emulation show cycle timing in more detail. FIG. 7 illustrates the show cycle timing in more detail.

DESCRIPTION OF CONNECTIVITY

FIG. 1 illustrates a development system 5. Development system 5 includes a data processing system 10 and a development tool 100. Data processing system 10 is coupled to development tool 100 via a bus 28, a plurality of integrated circuit terminals 24, a plurality of integrated circuit terminals 26, a plurality of integrated circuit terminals 30, a plurality of integrated circuit terminals 32, and a plurality of integrated circuit terminals 34. Bus 28 may be used interchangeably with a plurality of integrated circuit terminals 28 in the present document. Data processing system 10 includes a central processing unit (CPU) 12, a timer circuit 14, a system integration circuit 16, a serial communications circuit 18, an analog to digital (A/D) converter 20, and a static random access memory (SRAM) 22. Each CPU 12, timer circuit 14, system integration circuit 16, serial communications circuit 18, A/D converter 20, and SRAM 22 communicate internally via a bus 36. Furthermore, CPU 12 communicates externally to development tool 100 via the plurality of integrated circuit terminals 24. Similarly, timer circuit 14, system integration circuit 16, serial circuit 18, A/D converter 20, and SRAM 22 communicate externally to development tool 100 via the plurality of integrated circuit terminals 26, the plurality of integrated circuit terminals 28, the plurality of integrated circuit terminals 30, the plurality of integrated circuit terminals 32, and the plurality of integrated circuit terminals 34, respectively.

Figure 2:
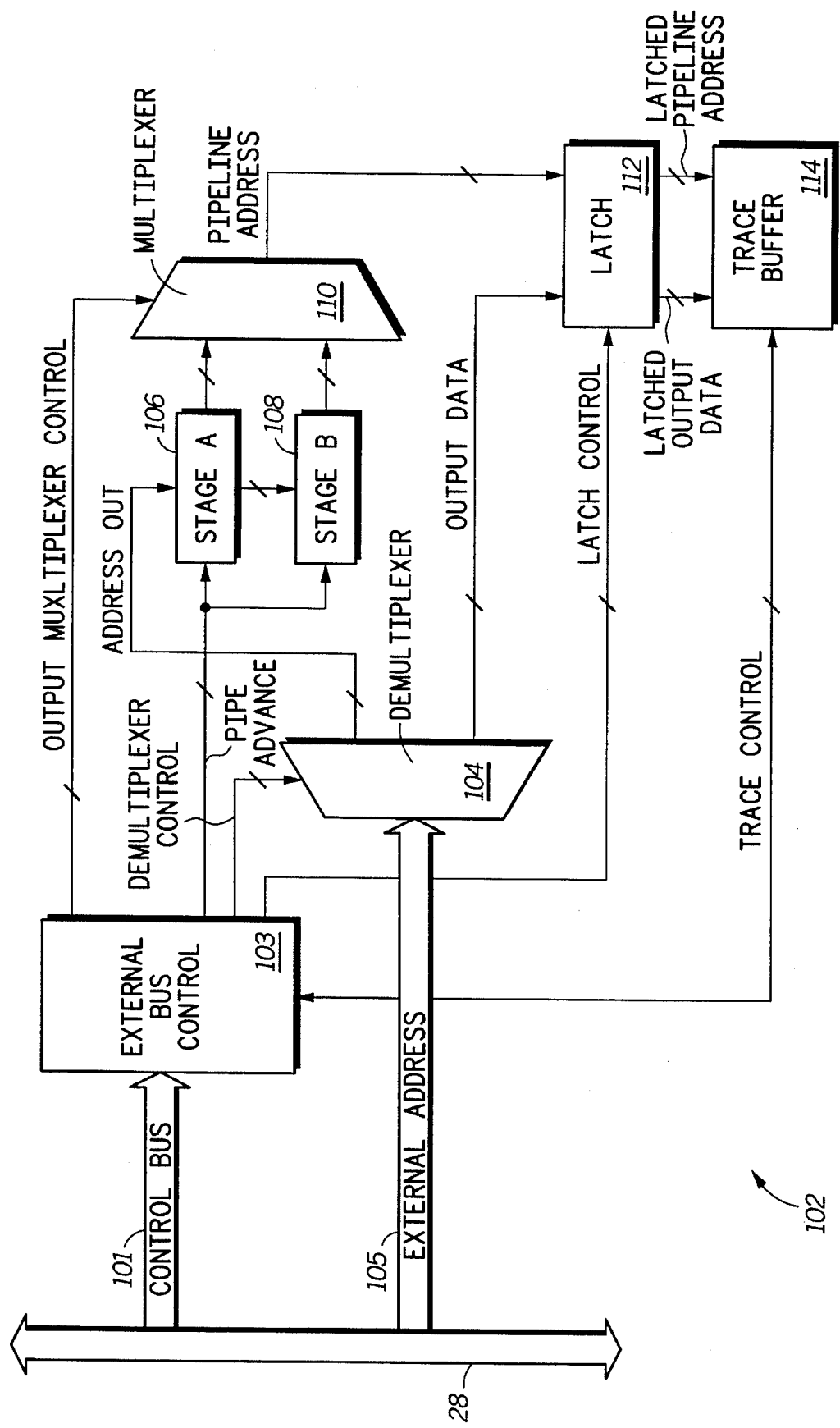
FIG. 2 illustrates a bus analyzer of the development system of FIG. 1.

FIG. 2 illustrates a portion of a bus analyzer circuit 102 which is included within development tool 100. Bus analyzer circuit 102 includes an external bus control circuit 103, a demultiplexer 104, a stage A register 106, a stage B register 108, a multiplexer 110, a latch 112, and a trace buffer 114. The plurality of integrated circuit terminals 28 provides a plurality of control signals to external bus control circuit 103 via a Control bus 101. External bus control circuit 103 provides an Output Multiplexer Control signal to a first input of multiplexer 110 and a Demultiplexer Control signal to a first input of demultiplexer 104. External bus control circuit 103 also provides a Pipe Advance signal to a first input of stage A register 106 and a first input of stage B register 108. Additionally, external bus control circuit 103 provides a Latch Control signal to a first input of latch 112 and communicates a Trace Control signal with trace buffer 114.

The plurality of integrated circuit terminals 28 also provide a plurality of external address signals to demultiplexer 104 via an External Address bus 105. Demultiplexer 104 provides an Address Out signal to a second input of stage A register 106. Stage A register 106 provides a first output to stage B register 108 and a second output to multiplexer 110. Stage B register 108 provides a first output to multiplexer 110. Multiplexer 110 is coupled to latch 112 to provide a Pipeline Address signal. Demultiplexer 104 is also coupled to latch 112 to provide an Output Data signal. Latch 112 provides the latched Output Data signal and the latched Pipeline Address signal to trace buffer 114.

Figure 3:
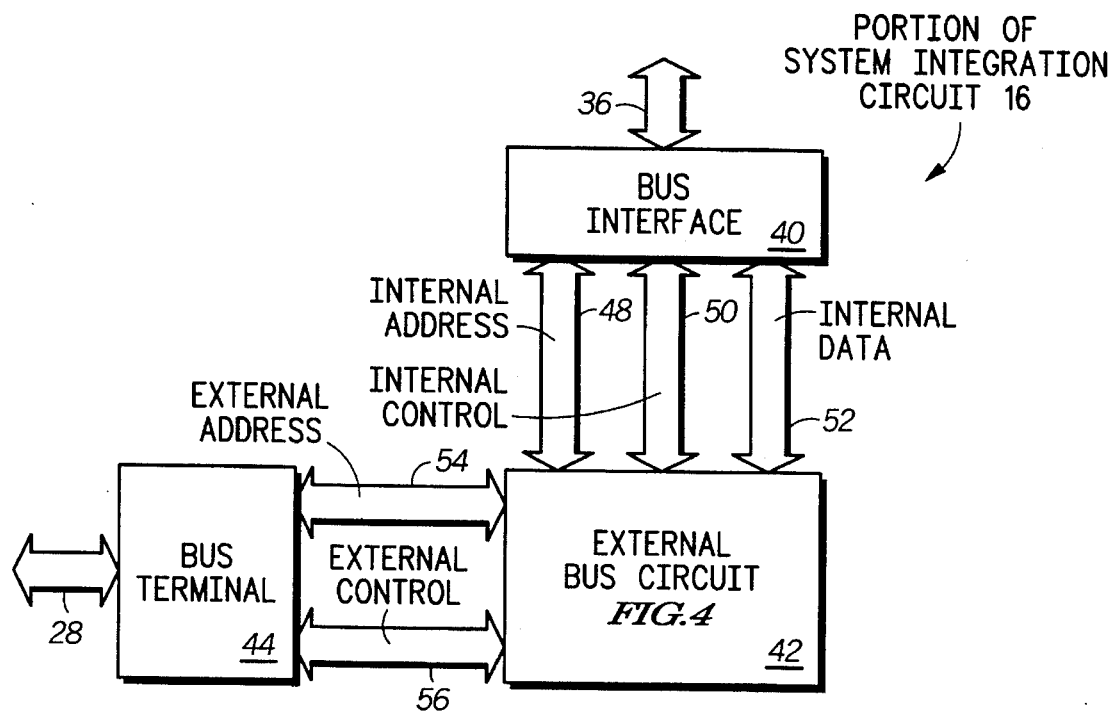
FIG. 3 illustrates a system integration circuit of the data processing system of FIG. 1.

FIG. 3 illustrates a portion of system integration circuit 16 of the data processing system 10 utilizing the present invention. System integration circuit 16 includes a bus interface unit 40, an external bus control 42, and a plurality of bus terminals 44. Bus interface unit 40 of system integration circuit 16 is coupled to a remaining portion of data processing system 10 via bus 36. Bus interface unit 40 is coupled to external bus control 42 via an Internal Address bus 48, an Internal Data bus 52, and an Internal Control bus 50. External bus control 42 is bidirectionally coupled to the plurality of bus terminals 44 via an External Address bus 54 and an External Control bus 56. The plurality of bus terminals 44 are coupled to development tool 100 via bus 28.

Figure 4:
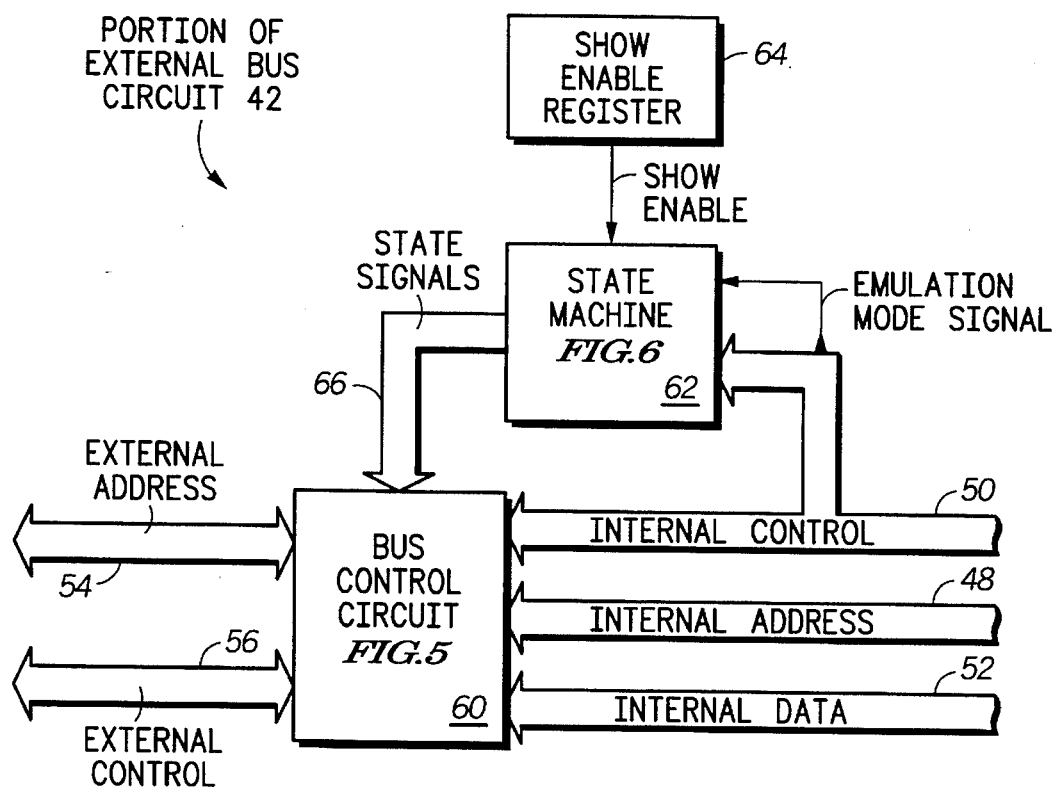
FIG. 4 illustrates an external bus circuit of the system integration circuit of FIG. 3.

FIG. 4 illustrates a portion of external bus circuit 42. External bus circuit 42 includes a bus control circuit 60, a state machine 62, and a show enable register 64. Bus control circuit 60 is coupled to the plurality of bus terminals 44 via the External Address bus 54 and the External Control bus 56. Bus control circuit 60 is coupled to bus interface 40 via Internal Address bus 48, Internal Control bus 50, and Internal Data bus 52. State machine 62 is coupled to Internal Control bus 50 for receiving a plurality of internal control signals and for receiving an Emulation Mode signal which indicates when data processing system 10 is operating in an emulation mode of operation. Show enable register 64 is coupled to state machine 62 via a Show Enable signal. State Machine 62 is also coupled to bus control circuit 60 via a State Signals bus 66.

Figure 5:
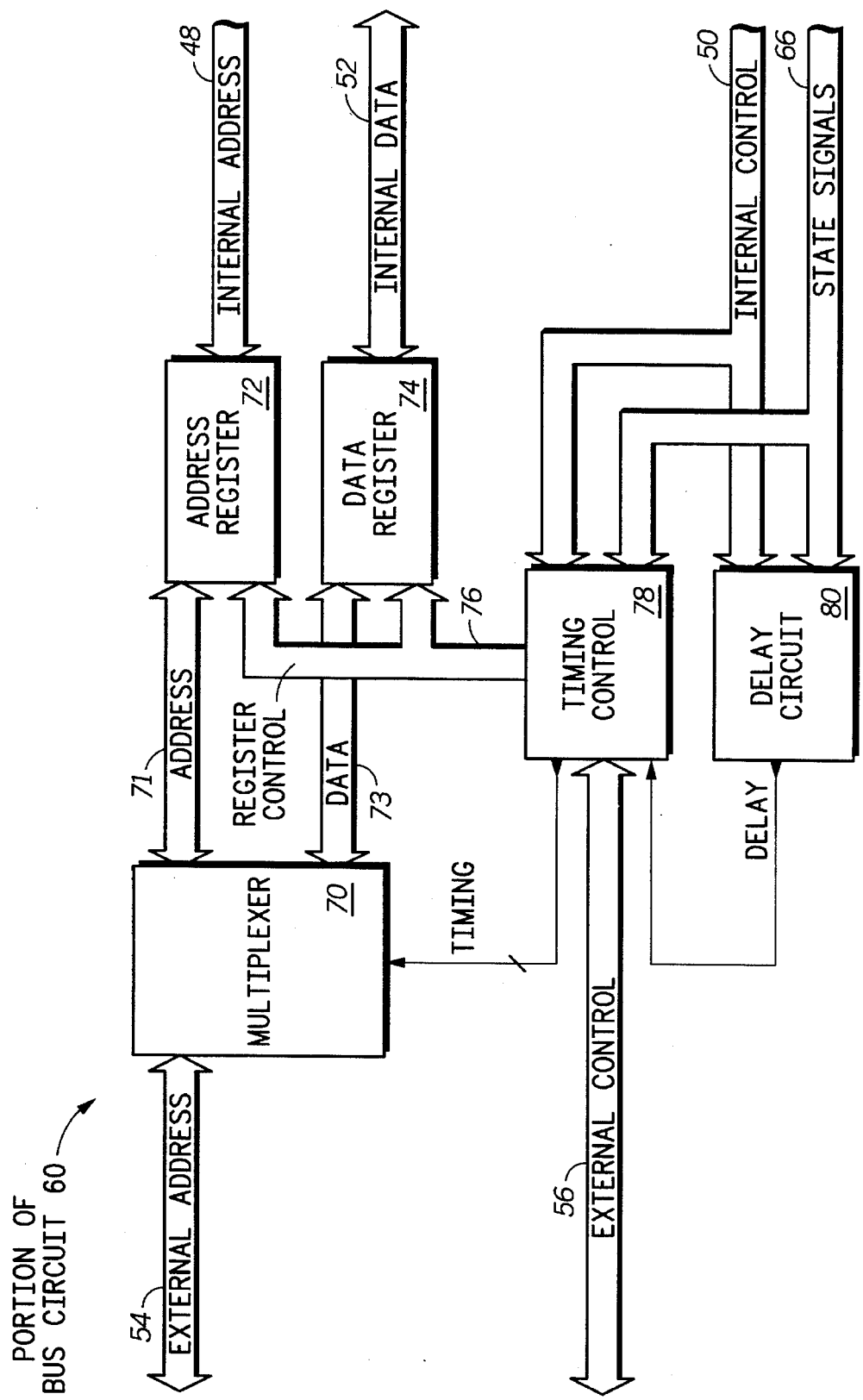
FIG. 5 illustrates a bus control circuit of the external bus circuit of FIG. 4.

FIG. 5 illustrates a portion of bus control circuit 60 in more detail. Bus control circuit 60 includes a multiplexer 70, an address register 72, a data register 74, a timing control circuit 78, and a delay circuit 80. Multiplexer 70 is coupled to External Address bus 54 and timing control circuit 78 is coupled to External Control bus 56. Multiplexer 70 is coupled to address register 72 via an Address bus 71 and is coupled to data register 74 via a Data bus 73. Address register 72 is also coupled to Internal Address bus 78 and to a Register Control bus 76. A plurality of register control signals is provided by timing control circuit 78 to address register 72 and data register 74 via Register Control bus 76. Data register 74 is coupled to Internal Data bus 52. Timing Control circuit 78 and delay circuit 80 are each coupled to both Internal Control bus 50 and State Signals bus 66. Delay circuit 80 is coupled to multiplexer 70 to provide a Delay signal. Timing control circuit 78 is coupled to multiplexer 70 to provide a plurality of Timing signals.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. It should also be noted that a "$" preceding a value indicates that the value is hexadecimal.

DESCRIPTION OF OPERATION

In a development environment, data processing system 10 of FIG. 1 may be operated in an emulation mode of operation. When operating in the emulation mode of operation, system integration circuit 16 provides a distinct behavior to support use of development tool 100. In particular, external bus circuit 42 (FIG. 3) of system integration circuit 16 provides this distinct behavior. This distinct behavior allows development tool 100 to achieve visibility of a plurality of internal operations of data processing system 10 while recreating an apparent normal mode of operation of data processing system 10 for use in another application (not illustrated herein). In some situations an emulation mode of operation may not be used, but some emulation-support functionality, or tracing capability is still required. In particular, a show-cycle mechanism is often required in a non-emulation environment which uses a logic analyzer to provide tracing of internal bus cycles of data processing system 10.

A show cycle is generally an internal bus cycle which is driven externally by external bus circuit 52 of system integration circuit 16 to provide external visibility of a bus cycle to development tool 100. In the embodiment of the invention illustrated in FIG. 1, the show cycle is provided to development tool 100 via one of the plurality of integrated circuit terminals 28.

When a bus does not communicate multiplexed address and data information, show cycles may be provided with slightly modified timing. The timing is modified to meet the physical requirements of driving internal data from a read or a write cycle of data processing system 10 externally to development tool 100. Generally, internal data from a read cycle internal to data processing system 10 is not valid until an end of an internal bus cycle and, therefore, the external data is not valid until after an end of the bus cycle. Indeed, when there are back-to-back bus cycles, the data retrieved during a show cycle is valid only after the start of the bus cycle following the show cycle.

In this mode of operation, the show cycle may be indicated by the Address Strobe (AS) signal being negated during the assertion of the Data Strobe (DS) signal, or by the state of an emulation chip select signal. Each of the DS, AS, and emulation chip select signals are provided to development tool 100 via a respective one of the plurality of integrated circuit terminals 28. The emulation chip select signal is typically available only in an emulation mode of operation. Often, an external circuit of an application (not illustrated herein) is protected from show cycles by incorporation of the AS signal into an external address decode circuit. Since the AS signal is not asserted during a show cycle operation, the show cycles are not destructive to an external application.

The present embodiment of the invention also allows show cycles to be provided when address and data information values are multiplexed on a single bus. When data is not provided on dedicated terminals of the data processor to reduce a pin count of the data processor, the show cycle, as well as other external bus cycles, are performed on the external multiplexed bus. Both show and normal cycles are performed on a multiplexed bus. Although a multiplexed bus is used externally, an internal bus read or write cycle is generated by the same technology and timing as the non-multiplexed bus configuration. However, it is even more complex to implement show cycles on a multiplexed bus due to physical constraints forced by the external device communicating with the multiplexed bus. Again, because of constraints within data processing system 10, data generated as a result of an internal read operation is not valid until an end of an internal bus cycle. However, due to the shared nature of the multiplexed bus, the delayed availability of data to the external device (development tool 100, in this embodiment of the invention) will not suffice if proper operation is desired. In the situation in which a non-multiplexed bus is used, system integration circuit 16 is free to drive a valid address for an external bus cycle immediately following a show cycle on a non-multiplexed address bus while the data from the show cycle is still held valid on the data bus. When a multiplexed bus is used, though, the data can not be driven on the multiplexed bus since an address of a following read or write operation in a subsequent bus cycle may be driven.

Therefore, during operation, a multiplexed show cycle borrows a later section of a following bus cycle. The address of a following external bus cycle is driven as a valid address and latched externally a brief period immediately following an address phase of a next bus cycle and before a data phase must be borrowed. Such operations are typically used with a multiplexed memory, an ASIC (Application Specific Integrated Circuit) device, or any other multiplexed external device. During the brief period immediately following an address phase of the next bus cycle, the data from the preceding show cycle is driven on the multiplexed bus. In the present embodiment of the invention, write operations internal to data processing system 10 do not pose the same timing problems as read cycles, since the data is valid earlier in the bus cycle. However, to provide a consistent interface to logic analyzers and bus analyzers, the write show cycle is consistent with the read show cycle to an external user.

As with a conventional show cycle on a non-multiplexed bus, the multiplexed show cycle may be indicated by the Address Strobe; (AS) signal being negated during the assertion of the Data Strobe (DS) signal, or by the state of the emulation chip select signal. The emulation chip select signal is typically available only in an emulation mode of operation. Often, an external circuit of an application (not illustrated herein) is protected from show cycles by incorporation of the AS signal into an external address decode circuit. Since the AS signal is not asserted during a show cycle operation, the show cycles are not destructive to an external application.

When data processing system 10 is operating in an emulation mode of operation, system integration circuit 16 must also provide real time visibility of write operations performed internally within data processing system 10. The ability to provide such write operations externally supports external synthesis of internal operations. In order for development tool 100 to properly synchronize with the internal activity of data processing system 10, external visibility of an internal write operation of data processing system 10 should be provided externally in a manner concurrent with execution of the internal write operation. If a traditional show cycle mechanism is used, the data written during the internal write operation would not be externally available until a following bus cycle and real-time emulation would not be possible. If the data is not provided externally, so that development tool 100 is able reproduce the activity concurrently with an internal write operation, synchronization between data processing system 10 and development tool 100 may be lost.

A solution provided by the present invention is to drive externally a data value which is to be written internally during a time the actual write operation occurs internally. In the present invention, this action is feasible because the data of the internal write cycle is known earlier in the internal cycle. Therefore, the data of the internal write cycle may be driven externally concurrently with execution of the internal operation. Development tool 100 may then observe all internal write cycle activity of data processing system 10 in real time.

FIG. 2 illustrates bus analyzer 102 of the development tool 100 in greater detail. Operation of bus analyzer 102 will subsequently be described in more detail. A description of the circuits in FIGS. 3 through 5 will also be subsequently described in more detail.

External bus circuit 42 of system integration module 16 is used to enable development tool 100 to observe all internal write cycle activity of data processing system 10 in real time. External bus circuit 42, illustrated in greater detail in FIG. 4, is capable of identifying whether or not each bus cycle is an internal bus cycle between on-chip resources, an external bus cycle between an on-chip resource and the external bus, an emulation cycle, or a show cycle.

If the cycle is an external bus cycle, a show cycle, or an emulation cycle, external bus circuit 42 communicates information regarding the internal activity transferred via Internal Address bus 48, Internal Control bus 50, Internal Data bus 52, External Address bus 54, and External Control bus 56. External bus circuit 42 uses External Address bus 54, and External Control bus 56 to communicate information to the plurality of integrated circuit terminals 28 via the plurality of bus terminals 44.

Typically, operation of data processing system 10 includes executing a program stored in off-chip storage, utilizing on-chip memory as a stack and data space, and using on-chip and off-chip peripherals for various system functions. System integration circuit 16 typically maintains control over external bus functions, allowing external bus circuit 42 to generate bus cycles associated with off-chip resources while isolating the external bus from internal activity. However, the emulation mode of operation will subsequently be described in more detail.

FIG. 5 illustrates a block diagram of bus control circuitry 60. Address register 72 latches address information at an appropriate time indicated by timing control circuit 78 and a portion of the register control signals transferred via Register Control bus 76. As well, data register 74 latches data information at an appropriate time indicated by timing control circuit 78 and a portion of the register control signals transferred via Register Control bus 76. Furthermore, it should be noted that the plurality of timing signals provided by timing control circuit 78 and the Delay signal provided by delay circuit 80 are provided to multiplexer 70 to control whether information communicated with External Address bus 54 is coupled either to address register 72 or to data register 74.

During operation, external bus circuit 42 generates external bus cycles using state machine 62. When a show enable bit stored in show enable register 64 is asserted, external bus circuit 42 generates show cycles and communicates the show cycles with development tool 100 via the plurality of bus terminals 44 and the plurality of integrated circuit terminals 28. The Show Enable bit is subsequently provided to state machine 62.

State machine 62 receives Internal Control bus 50, the Emulation Mode signal, and the Show Enable signal. State machine 62 provides the plurality of State Signals 66 to control a phase of an external bus cycle and functions in a manner represented by the state diagram illustrated in FIG. 6. Behavior of the plurality of control signals communicated by External Control bus 56 and the plurality of address signals communicated by External Address bus 54 is dependent upon a mode of operation of data processing system 10. The mode of operation is reflected by a logic value of the Show Enable signal and the Emulation Mode signal. The effects of the modes and controls will be further discussed in relation to the various bus cycles and the associated timing diagrams illustrated in FIGS. 7, 8, and 9.

Figure 6:
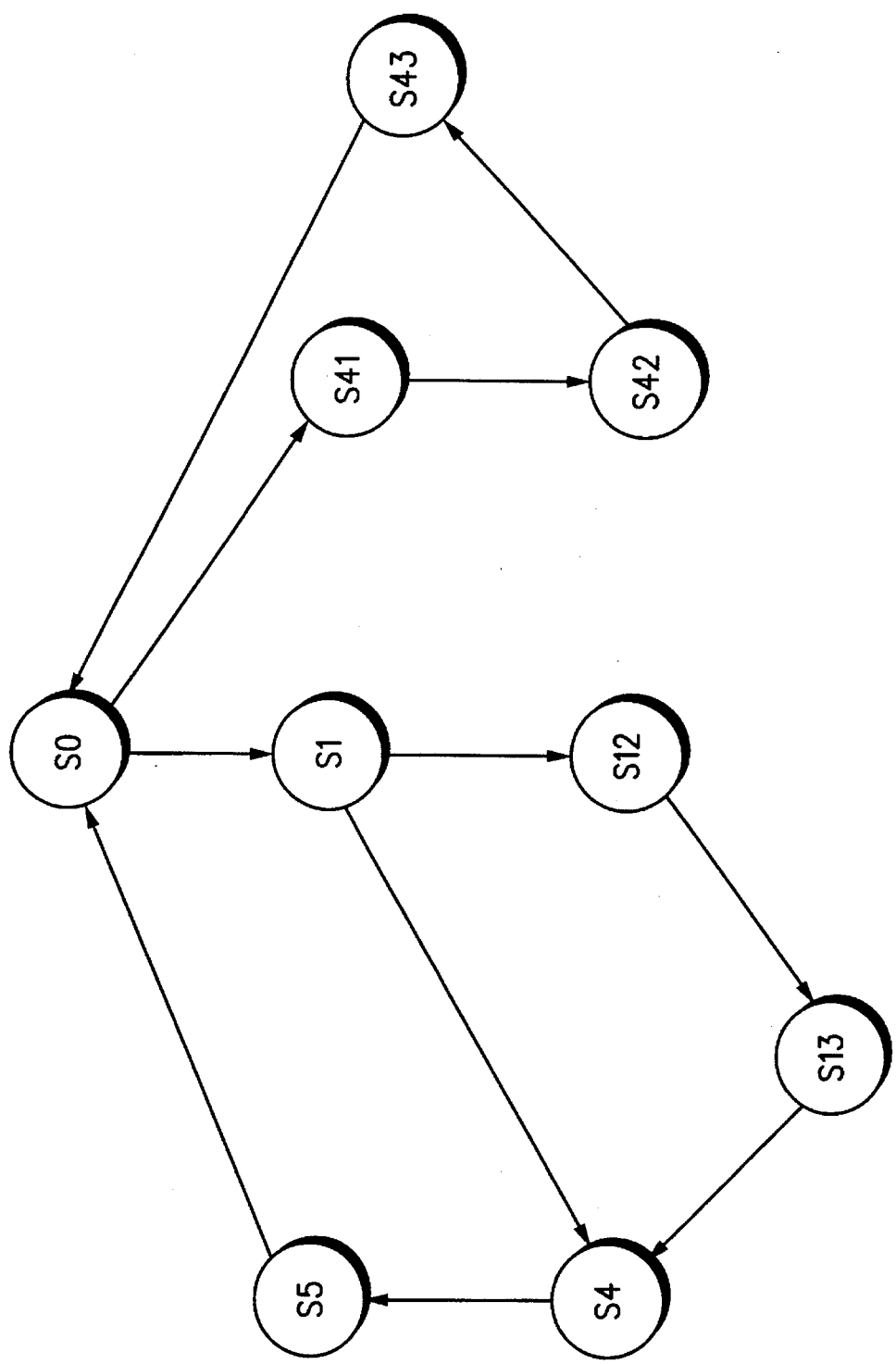
FIG. 6 illustrates a state machine of the external bus circuit of FIG. 4.

FIG. 6 illustrates a state diagram which represents operation of state machine 62. State machine 62 includes the following states: S0, S1, S12, S13, S4, S5, S41, S42, and S43. Each state of state machine 62 represents a time interval in a bus cycle. It should be noted that several activities may take place in each state.

Each bus cycle begins in state S0. At state S0, an internal address is latched in address register 72 and is driven onto external address bus 54. A R/W̄ signal, transferred via External Control bus 56 of FIG. 5, is provided in a logic state to indicate a read or a write operation and an address latch enable (ALE) signal is asserted. The ALE signals is transferred via External Control bus 56 of FIG. 5. State machine 62 determines if the cycle is an internal cycle, an external cycle, a show cycle, or an emulation cycle. Emulation chip select signals are set to indicate a current bus cycle type. The emulation chip select signals are provided by timing control 78 to indicate the cycle type externally. Timing control 78 generates the emulation chip select signals from information received via Information Control bus 50 and the plurality of State signals 66. The emulation chip select signals are transferred via External Control bus 56 and Bus 28.

If the cycle is an internal cycle and the Show Enable signal is asserted, state machine 66 transfers from state S0 to state S41 to continue as a show cycle. In state S41, the address latch enable signal is negated and a data strobe (DS) signal is asserted. An Address strobe (AS) signal remains negated in this state. The Address Strobe and Data Strobe signals are transferred via External Control bus 56 of FIG. 5. The Emulation Mode signal is also tested. If the Emulation Mode signal is asserted to indicate data processing system 10 is in emulation mode and the previous cycle was a show cycle, a data value which is internally transferred during a previous bus cycle and latched in data register 74 is driven on External Address bus 54.

State S42 is executed after state S41. In state S42, the Emulation Mode signal is tested. If the Emulation Mode signal is negated and the previous cycle was a show cycle, the data value transferred via a previous bus cycle and latched in data register 74 is multiplexed on External Address bus 54. If the Emulation Mode signal is asserted and the current bus cycle is a write cycle, internal data is latched in data register 74.

State S43 is executed after state S42. In state S43, the data strobe (DS) signal is negated. The Emulation Mode signal is tested again. If the Emulation Mode signal is asserted and the current cycle is a show-write cycle, the data latched in data register 74 is multiplexed on External Address bus 54. In case of a read cycle or if the Emulation Mode signal is negated, internal data is latched in data register 74. After state S43 is executed, state control returns to state S0 for the start of the next cycle.

As before, at state S0 the internal address is latched in address register 72 and is driven onto External Address bus 54. The R/W signal is set to indicate a read or a write cycle and the address latch enable signal is asserted. The state machine determines if the cycle is an internal cycle, an external cycle, a show cycle, or an emulation cycle. The emulation chip select signals are set to indicate the cycle type on External Control bus 56.

If the cycle is not internal, state machine 66 transfers control from state S0 to state S1 to continue as an external cycle or as emulation cycle. In state S1, the address latch enable signal is negated and the address strobe (AS) signal is asserted. The data strobe (DS) signal remains negated in this state. The Emulation Mode signal is also tested. If the Emulation Mode signal is asserted and the previous cycle was a show cycle, the data value transferred during the previous bus cycle and latched in data register 74 is multiplexed on External Address bus 54. If the cycle is an external cycle, state S12 is executed. If the cycle is an emulation cycle, state S4 is executed.

In state S12, the Emulation mode signal is tested. If the Emulation Mode signal is negated and a previous cycle was a show cycle, the data value transferred during a previous bus cycle and latched in data register 74 is multiplexed on External Address bus 54. State S13 is then executed. In state S13, the data strobe (DS) signal is asserted. In the case of a write cycle, data latched in data register 74 is transferred to External Address bus 54.

State S4 is then executed. In state S4, data latched in Data Register 74 is transferred to external address 54 if a write cycle is indicated. If a read cycle is indicated, external data is provided by an external memory or device to External Address bus 54. The external data is provided to multiplexer 70 and subsequently latched in data register 74.

State S5 is then executed. In state S5, both the address strobe (AS) and data strobe (DS) signals are negated to indicate an end of the external bus cycle. In the case of a read cycle, the data latched in data register 74 is driven on Internal Data bus 52. After S5, state S0 is again executed for the start of a next bus cycle.

Each of the bus cycle operations described above with reference to state machine 66 and the state diagram of FIG. 6 are illustrated in timing diagram form in FIGS. 7, 8, and 9. FIGS. 7, 8, and 9 illustrate various combinations of show, emulation, and external bus cycles. In each of FIGS. 7, 8, and 9, note that the states of state machine 66 of FIG. 6 are indicated above a system clock waveform. Also note that all bus cycles start in state S0 and that an internal address value is valid at a beginning of each bus cycle. Additionally, there is consistency in the internal behavior of the internal data. The internal data becomes valid during a second phase of a first clock of each write cycle and is valid at a rising edge of a second phase of a last clock of each read cycle. The external multiplexed bus, denoted Multiplexed Address/Data, provides the address during state S0 of each bus cycle and the address latch enable signal provides a pulse that can be used by external circuitry to latch a valid address.

FIG. 7 illustrates a relationship in time between various signals on the multiplexed bus during two consecutive show cycles followed by a normal external cycle. A first bus cycle is a Read Show Cycle, as indicated by the address strobe (AS) signal being negated, the data strobe (DS) signal being asserted, and the Read/$\overline{\text{Write}}$ signal being asserted to indicate a read cycle. Note that data is not driven onto the multiplexed bus during the first bus cycle.

A second bus cycle is a Write Shove Cycle, as indicated by the AS signal being negated during the bus cycle, the DS signal being asserted, and the Read/$\overline{\text{Write}}$ signal being negated to indicate a write cycle. The data from the previous show cycle is driven after the address, starting in state S42 and ending at the beginning of a following cycle.

During a first show cycle of a sequence of show cycles, there is no data phase. Until an end of the sequence of show cycles, the data from a particular show cycle is driven during a following bus cycle. At the end of the sequence, an external cycle is performed with two data phases, as shown in FIG. 7.

FIG. 7 also illustrates a relationship between signals when a show write cycle is followed by an external read cycle. While the address is asserted and latched early in the external read cycle, the read data is not presented until late in the external read cycle. A remaining period in the middle of the external read cycle is then used to display data from a preceding show cycle. Note that the DS signal indicates a status of the current bus cycle and that an external mechanism for tracking show cycles should use a system clock signal, a current state of various bus control signals, and a previous show cycle indication in order to properly latch the show data.

FIG. 8 illustrates a relationship in time between various signals on the multiplexed bus during consecutive emulation show cycles followed by an emulation external read cycle. A first cycle is a read show cycle, as indicated by the AS signal being negated during the bus cycle, the DS signal being asserted, and the Read/$\overline{\text{Write}}$ signal being asserted to indicate a read cycle. The emulation chip select signals indicate a show cycle during states S0 through S41. Note that the rising edge of the DS signal may be used to gate a second rising edge of the system clock for latching data of a current cycle if required for real-time support of the emulation system.

A second cycle is an emulation write show cycle, as indicated by the AS signal being negated during the bus cycle, the DS signal being asserted, and the Read/$\overline{\text{Write}}$ signal being negated to indicate a write cycle. The emulation chip select signals indicate a show cycle during states S0 through S41. Data from a previous emulation cycle is driven after the address value. Note that the rising edge of the DS signal may be used to gate a second rising edge of the system clock for latching data of a current cycle if required for real-time support of the emulation system.

Note that each emulation write show cycle provides current data at the end cycle period. Therefore, any emulation write show cycle will provide two data phases.

FIG. 8 also shows a relationship between the signals during an emulation write show cycle followed by an external two-clock emulation read cycle. While the address of the external two clock emulation read cycle is asserted and latched early in the bus cycle, the read data is not present until late in the cycle (S4). A remaining period in the middle of the bus cycle (sometime during a period from S1 to S4) is then used to display the data from the preceding emulation show cycle. Note that unlike the (three-clock) external cycle following a show cycle, the DS signal is not asserted. However, the AS signal provides a strobe signal to a current bus cycle such that a memory interface may use the strobe signal in combination with R/W and other timing signals to effectively form a read strobe signal. An external mechanism for tracking bus cycles should use the system clock, the current state of various bus control signals, and the previous emulation show cycle indication in order to properly latch the emulation data driven during an external cycle.

FIG. 9 shows the relationship between a sequence of emulation show cycles followed by an external two-clock write cycle. A first cycle is an emulation read show cycle, as indicated by the AS signal being negated during the bus cycle, the DS signal being asserted, and the Read/Write signal being asserted to indicate a read cycle. The emulation chip select signals indicate a show cycle during states S0 through S41. Note that the rising edge of the DS signal may be used to gate a second rising edge of the system clock for latching data of a current cycle if required for real-time support of the emulation system.

A second cycle is an emulation write show cycle, as indicated by the AS signal being negated during the bus cycle, the DS signal being asserted, and the Read/Write signal being negated to indicate a write cycle. The emulation chip select signals indicate a show cycle during states S0 through S41. Data from a previous emulation cycle is driven after the address value. Note that the rising edge of the DS signal may be used to gate a second rising edge of the system clock for latching data of a current cycle if required for real-time support of the emulation system. Note that each emulation write show cycle provides current data at the end cycle period. Therefore, any emulation write show cycle will provide two data phases.

FIG. 8 also shows a relationship between the signals during an emulation write show cycle followed by an external write cycle. While the address of an emulation external cycle is externally asserted and latched early in the bus cycle, the write data is not present until late in the cycle (S4). A remaining period in the middle of the bus cycle (sometime during a period from S1 to S4) is then used to display the data from the preceding emulation show cycle. Note that unlike the (three-clock) external cycle following a show cycle, the DS signal is not asserted. However, the AS signal provides a strobe signal to a current bus cycle such that a memory interface may use the strobe signal in combination with R/W and other timing signals to effectively form a read strobe signal. An external mechanism for tracking bus cycles should use the system clock, the current state of various bus control signals, and the previous emulation show cycle indication in order to properly latch the emulation data driven during an external cycle.

In a summation of operation, each of FIGS. 1 through 9 will be incorporated to provide a detailed description of the operation of the present invention. During operation of the embodiment of the invention illustrated herein, a standard multiplexed show cycle is decoded by bus analyzer 102 of development tool 100 using external bus control circuit 103, bus demultiplexer 104, stage A register 106, stage B register 108, multiplexer 110, latch 112, and trace buffer 114 of FIG. 2.

There are two modes of operation which are dependent on a sequence of bus cycle types. The modes of operation differ primarily in that the bus cycles preceded by show cycles exhibit a double data phase which allows for the effective use of show cycles on a fast multiplexed bus.

When a multiplexed show cycle is preceded by a multiplexed show cycle and followed by a multiplexed external cycle in normal mode, timing similar to that illustrated in FIG. 7 is employed. During a first bus cycle, the AS signal is negated. The DS signal is asserted at state S41 and negated at state S43. This sequence of assertion and negation of the AS and DS signals indicate the first cycle is a show cycle. At state S0, the address of the first cycle, A1, is present on the Multiplexed Address/Data. Multiplexed Address/Data and External Address bus 105 are used interchangeably throughout this document. Address latch enable, transferred via External Control bus 56 and Bus 28, is asserted at state S0 and negated at state S1 to indicate that an address on the Multiplexed Address/Data is valid. In bus analyzer 102 of FIG. 2, the value communicated by External Address bus 105 is routed to the Address Out signal via demultiplexer 104 and latched into Stage A register 106, a first stage of a pipeline where the address value is temporarily stored.

During a second bus cycle, the AS signal is negated. The DS signal is asserted at state S41 and negated at state S43. The relationship between the negation and assertion of the AS and DS signals indicate the second cycle is also a show cycle. At the second state S0, the address of the second bus cycle, A2, is present on the Multiplexed Address/Data terminal. The address latch enable signal is asserted at state S0 and negated at state S1 to indicate that the address on the Multiplexed Address/Data terminal or External Address bus 105 is valid. External Address bus 105 is routed to the Address Out signal. The address latched in the stage A register 106 (A1) is transferred to stage B register 108, and the address of the second cycle, A2, is present on External Address bus 105 and latched into a first stage of the pipeline where it is held.

During states S42 and S43 of the show write cycle, the data of the first bus cycle D1 is present on the External Address bus 105. External Address bus 105 is routed to the Output Data signal. Multiplexer 110 routes the address from stage B register 108, A1, to the pipeline address. By the end of state S42, the data present on the Output Data signal, D1, and the address present on the pipeline address bus (A1) are latched into latch 112 and subsequently transferred into trace buffer 114.

During a third bus cycle, both the AS and DS signals are asserted. The relationship between the negation and assertion of the AS and DS signals indicate this cycle is an external bus cycle. At state S0, an address of a third cycle, A3, is present on External Address bus 105. The address latch enable signal is asserted at state S0 and negated at state S1 to indicate that the address on External Address bus 105 is valid. The value communicated by External Address bus 105 is routed to the Address Out signal. The address latched in stage A register 106 (A2) is transferred to stage B register 108, and an address of the third cycle, A3, is present on External Address bus 105 and latched into the first stage of the pipeline where it is held. During states S12 and S13 of the third bus cycle (the external read cycle), the data of the second bus cycle, D2, is communicated by External Address bus 105. The data, D2, is subsequently routed to the Output Data bus signal. Multiplexer 110 routes the address, A2, from stage B register 108 to the pipeline address. By the end of execution of state S12, the data, D2, present on the Output Data signal and the address, A2, present on the Pipeline Address signal are latched into latch 112 and subsequently transferred into trace buffer 114.

In state S4 of the read cycle, data is provided on the External Address bus 105 bus by external memory or device. The External Address bus 105 bus is routed to the Output Data signals. Multiplexer 110 routes the address from stage A register, A3, to the Pipeline Address signal. By the end of state S4, the data, D3, present on the Output Data signal and the address, A3, present on the Pipeline Address signal (A3) are latched into latch 112 and subsequently transferred into the trace buffer 114.

During the bus cycles described above, the Read/$\overline{\text{Write}}$ signal indicates if the bus cycle is a read cycle or a write cycle.

When an emulation show write cycle is preceded by a emulation show read cycle and followed by a multiplexed external read cycle in emulation mode, timing similar to that illustrated in FIG. 8 is used. During the first bus cycle, the AS signal is negated. The DS signal is asserted at state S41 and negated at state S43. The relationship between the negation and assertion of the AS and DS signals indicates that this first bus cycle is a show cycle. At state S0, the address, A1, of the first bus cycle, is communicated on External Address bus 105. The address latch enable signal is asserted at state S0 and negated at state S1 to indicate that the address on External Address bus 105 is valid. External Address bus 105 is routed to the Address Out signal and latched by the end of state S0 into stage A register 106, the first stage of the pipeline where it is temporarily held.

During a second bus cycle, the AS signal is negated. The DS signal is asserted at state S41 and negated at state S43. The relationship between the negation and assertion of the AS and DS signals indicate this second bus cycle is also a show cycle. At the second state S0 the address, A2, of the second bus cycle, is present on External Address bus 105. The address latch enable signal is asserted at state S0 and negated at state S1 to indicate that an address on External Address bus 105 is valid. The address value transferred by External Address bus 105 is routed to the Address Out signal. The address (A1) latched in the first stage (Stage A register 106) of the pipeline is transferred to the second stage (Stage B register 108), and the address (A2) of the second bus cycle is present on the External Address bus 105 and is latched into the first stage of the pipeline at state S0 where it is temporarily stored.

During states S41 and S42 of the second bus cycle, the show write cycle, the data value, D1, of the first bus cycle is transferred by External Address bus 105. The data value, D1, is subsequently routed to the Output Data signal. Multiplexer 110 routes the address, A1, from stage B register 108 to the Pipeline Address signal. By the end of state S41, the data, D1, present on the Output Data signal and the address, A1, present on the Pipeline Address signal are latched into latch 112, and into the trace buffer 114.

During state S43 of the second bus cycle, the write-show-cycle, the data, D2, of the second bus cycle is present on External Address bus 105. Normally, data is latched into an internal register (not shown herein) at this time. Providing data externally at the same time as it would have been written internally enables development tool 100 to reproduce the internal activity of data processing system 10 in real-time. Note that the same data, D2, is again provided on External Address bus 105 using a timing configuration similar to the timing of the read cycle. Therefore, there is no need to latch the data in trace buffer 114 at this time.

During a third bus cycle, the AS signal is asserted to indicate that this cycle is an external bus cycle. At state S0, the address, A3, of the third bus cycle, is communicated via External Address bus 105. The address latch enable signal is asserted at state S0 and negated at state S1 to indicate that the address on External Address bus 105 is valid. The address transferred via External Address bus 105 is subsequently routed to the Address Out signal. The address (A2) latched in the first stage of the pipeline is transferred to a second stage, and the address (A3) of the third bus cycle is transferred via External Address bus 105. The address (A3) of the third bus cycle is latched by the end of state S0 into the first stage of the pipeline where it is temporarily stored. During state S1 of the third bus cycle, the external read cycle, the data, D2, of the second bus cycle is present on External Address bus 105. The data, D2, is subsequently routed to the Output Data signal. Multiplexer 110 routes the address, A2, stored in stage B register 108 to the Pipeline Address signal. By the end of state S1, the data, D2, present on the Output Data signal and the address, A2, present on the Pipeline Address signal are latched into latch 112 and into trace buffer 114. Note that the address and data of the second bus cycle, the write-show-cycle, are latched into latch 112 using timing similar to that of the first bus cycle, the read-show-cycle.

At state S4 of the external read cycle, data is transferred to External Address bus 105 by an external memory or device (not shown herein). External Address bus 105 is routed to the Output Data signal. Multiplexer 110 routes the address, A3, from stage A register 106 to the Pipeline Address signal. By the end of state S4, the data, D3, present on the Output Data signal and the address, A3, present on the Pipeline Address signal are latched into latch 112 and into trace buffer 114.

During the bus cycles described above, the Read/$\overline{\text{Write}}$ signal indicates if the bus cycle is a read cycle or a write cycle. The state of the emulation chip select signals during the falling edge of state S0 indicates if the cycle is a normal external cycle, emulation cycle, or a show cycle.

When an emulation show write cycle is preceded by an emulation show read cycle and followed by a multiplexed external write cycle in emulation mode, timing corresponding to that of FIG. 9 is used. During a first bus cycle, the AS signal is negated. The DS signal is asserted at state S41 and negated at state S43. The relationship between the negation and assertion of the AS and DS signals indicate this first bus cycle is a show cycle. At state S0, the address, A1, of the first bus cycle is transferred on External Address bus 105. The address latch enable signal is asserted at state S0 and negated at state S1 to indicate that the address on External Address bus 105 is valid. The address transferred via External Address bus 105 is routed to the Address Out signal and latched into a first stage of the pipeline where it is temporarily stored at the end of state S0.

During a second bus cycle, the AS signal is negated. The DS signal is asserted at state S41 and negated at state S43. The relationship between the negation and assertion of the AS and DS signals indicate this second bus cycle is also a show cycle. At the second state S0, the address, A2, of the second bus cycle, is transferred to External Address bus 105. The address latch enable signal is asserted at state S0 and negated at state S1 to indicate that the address on External Address bus 105 is valid. The address on External Address bus 105 is routed to the Address Out signal. The address, A1, latched in the first stage is transferred to the second stage, and the address, A2, of the second bus cycle is transferred to External Address bus 105 and latched into the first stage of the pipeline by the end of stage S0 where it is temporarily stored.

During states S41 and S42 of the second bus cycle, the show write, the data, D1, of the first bus cycle is transferred to the External Address bus 105. The D1 value is transferred by External Address bus 105 to the Output Data signal. Multiplexer 110 routes the address, A1, from stage B register 108 to the Pipeline Address signal. By the end of state S41, the data, D1, present on the Output Data signal and the address, A1, present on the Pipeline Address signal are latched into latch 112 and into the trace buffer 114.

During state S43 of the second bus cycle, the write-show-cycle, the data, D2, of the second bus cycle is present on External Address bus 105. Normally, data is latched into an internal register (not shown herein) at this time. Providing the data externally at the same time as it would have been written internally enables development tool 100 to concurrently reproduce the internal activity data processing system 10. Note that the same data, D2, is again provided via External Address bus 105 using timing similar to the read cycle. Therefore, there is no need to latch the data in trace buffer 114 at this time.

During a third bus cycle, the AS signal is asserted to indicate this cycle is an external bus cycle. At state S0, the address, A3, of the third bus cycle, is present on External Address bus 105. The address latch enable signal is asserted at state S0 and negated at state S1 to indicate that the address on External Address bus 105 is valid. The address transferred on External Address bus 105 is routed to the Address Out signal. The address, A2, latched in the first stage is transferred to the second stage, and the address, A3, of the third bus cycle is transferred to External Address bus 105. The address, A3, is latched by the end of state S0 into a first stage of the pipeline where it is held. During state S1 of the third bus cycle, the external write cycle, the data, D2, of the second bus cycle is present on External Address bus 105. The address transferred via External Address bus 105 is routed to the Output Data signal. Multiplexer 110 routes the address, A2, from stage B register 108, to the Pipeline Address signal. By the end of state S1, the data, D2, present on the Output Data signal and the address, A2, present on the Pipeline Address signal are latched into latch 112 and into the trace buffer 114. Note that the address and data of the second bus cycle, the write-show-cycle, are latched into latch 112 using timing similar to that of the first bus cycle, the read-show-cycle.

At state S4 of the external write cycle, data is provided to External Address bus 105. The address provided to External Address bus 105 is routed to the Output Data signal. Multiplexer 110 routes the address, A3, from stage A register 106 to the Pipeline Address signal. By the end of state S4, the data, D3, present on the Output Data signal and the address, A3, present on the Pipeline Address signal are latched into latch 112 and into the trace buffer 114.

During the bus cycles described above, the Read/Write signal indicates whether the bus cycle is a read cycle or a write cycle. The state of the emulation chip select signals during a falling edge of state S0 indicates if the cycle is a normal external cycle, an emulation cycle, or a show cycle.

Generally, the emulation cycle is used to track the control of internal functions of data processing system 10 through the use of external shadow registers. The emulation chip select signals are decoded concurrently with the latched address phase of the multiplexed bus cycle to generate the address of the shadow register. The shadow register is associated with an external synthesis circuit which requires real-time visibility of control changes in order to remain synchronous with internal data processing functions. Typical development tools will exploit this feature to support several individual functions. Each of the functions exhibits the same basic architecture of a shadow register and provides real-time duplication of an internal register which controls an external function that must track the behavior of an internal function in real time. These functions are reliant upon the emulation cycle's provision of internal write visibility in real time.

This present invention may be separated into two modes of operation. The first mode supports a standard show-cycle on a multiplexed bus for interface to a logic analyzer, The second mode supports emulation tools with real-time tracking of control functions a multiplexed bus. The first mode is used heavily in the debugging the software and the hardware of systems using a low cost MCU interface tool along with a timing analyzer. The second mode is used primarily in the debugging of firmware using an in-circuit-emulation system, which provides a bus analyzer as well as various other system analysis features.

Multiplexed address and data busses have been used in data processors to limit a pin count of a data processor. However, with the advent of applications requiring high-end data processors having low terminal counts, new problems, such as the limited external visibility of internal operations, are encountered. By providing a unique timing mechanism, the present invention illustrates a unique solution to such technological difficulties.

Furthermore, the implementation of the invention described herein is provided by way of example only. Many other implementations may exist for executing the function described herein. For example, development tool may have an architecture different than that illustrated in FIG. 2. FIG. 2 is merely an example of one type of development tool. Additionally, the control signals transferred via External Control bus 56 may include additional signal than those disclosed herein. As well, the control signals may have different timing and perform different functions. The emulation chip select signals may indicate types of bus cycles not described herein in detail. Furthermore, state machine 62 may also be modified to have more or less states or different timing paths than illustrated in FIG. 6. Different control may also be implemented to replace the state machine disclosed herein.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processor, comprising:

a central processing unit for providing a plurality of control signals, a plurality of address values, and a plurality of data values; and a system integration circuit coupled to the data processor for receiving the plurality of control signals, the plurality of address values, and the plurality of data values, the system integration circuit generating a first control signal enabling the data processor to execute a show cycle, the system integration circuit providing the plurality of address values and the plurality of data values in a first predetermined format on a multiplexed bus when the first one of the plurality of control signals indicates the data processor is executing the show cycle, the first predetermined format including a first one of the plurality of data values which is associated with a first address value and is accessed during a first bus cycle, the system integration circuit providing the first one of the plurality of data values to the multiplexed bus during a second cycle in which a second one of the plurality of address values is provided to the multiplexed bus.

2. The data processor of claim 1 wherein the system integration circuit is coupled to a pipelined development system.

3. The data processor of claim 1 wherein the system integration circuit comprises:

interface means coupled to the central processing unit for receiving the first one of the plurality of control signals, the plurality of address values, and the plurality of data values; and a bus control circuit coupled to the interface means for receiving the first one of the plurality of control signals, a plurality of address values, and a plurality of data values, the bus control circuit providing the plurality of address values and the plurality of data values in the first predetermined format.

4. The data processor of claim 3 wherein the system integration circuit comprises:

a state machine for providing a plurality of state signals to control operation of the system integration circuit when the data processor is executing the show cycle, the state machine being coupled to the interface means for receiving the first one of the plurality of control signals.

5. The data processor of claim 4 wherein the bus control circuit comprises:

a timing control circuit coupled to the interface means for receiving the first one of the plurality of control signals and coupled to the state machine for receiving the plurality of state signals, the timing control circuit providing a plurality of timing signals;

a delay circuit coupled to the interface means for receiving the first one of the plurality of control signals and coupled to the state machine for receiving the plurality of state signals, the delay circuit providing a delay signal to indicate a timing delay operation;

a data register for selectively storing each of the plurality of data values;

an address register for selectively storing each of the plurality of address values; and a multiplexer for multiplexing each of the plurality of the data values with each of the plurality of address values to provide the plurality of address values and the plurality of data values in the first predetermined format, the multiplexer being coupled to the address register for receiving the plurality of address values, being coupled to the data register for receiving the plurality of data values, being coupled to the delay circuit for receiving the delay signal, and being coupled to the timing control circuit for receiving the plurality of timing signals.

6. The data processor of claim 1 wherein the second bus cycle is consecutive in time to the first bus cycle.

7. The data processor of claim 1 wherein the first one of the plurality of data values is accessed during one of a read operation or a write operation.

8. The data processor of claim 1 wherein the first one of the plurality of address values is accessed during one of a read and a write operation.

9. A method for providing a show cycle on a multiplexed bus of a data processor, comprising the steps of:

enabling the central processing unit of the data processor to provide a plurality of address values, a plurality of data values, and a plurality of control signals;

enabling a system integration circuit to generate a first control signal for enabling the data processor to execute the show cycle, the system integration circuit providing the plurality of address values and the plurality of data values in a first predetermined format on the multiplexed bus when the first one of the plurality of control signals enable the data processor to execute the show cycle, the first predetermined format including a first one of the plurality of data values which is associated with a first address and which is accessed during a first bus cycle, the system integration circuit providing the first of the plurality of data values on the multiplexed bus during a second cycle in which a second one of the plurality of address values is provided to the multiplexed bus.

10. The method of claim 9 further comprising the steps of:

coupling an interface circuit to the central processing unit for receiving the first one of the plurality of control signals, the plurality of address values, and the plurality of data values;

coupling a state machine to the interface circuit for receiving the first one of the plurality of control signals, the state machine providing a plurality of state signals to control operation of the system integration circuit when the data processor is executing the show cycle;

coupling a timing control circuit to the interface circuit for receiving the first one of the plurality of control signals and coupled to the state machine for receiving the plurality of state signals, the timing control circuit providing a plurality of timing signals;

coupling a delay circuit coupled to the interface circuit for receiving the first one of the plurality of control signals and coupled to the state machine for receiving the plurality of state signals, the delay circuit providing a delay signal to indicate a timing delay operation;

enabling a data register to selectively store each of the plurality of data values;

enabling an address register to selectively store each of the plurality of address values; and providing a multiplexer for multiplexing each of the plurality of the data values with each of the plurality of address values to provide the plurality of address values and the plurality of data values in the first predetermined format, the multiplexer being coupled to the address register for receiving the plurality of address values, being coupled to the data register for receiving the plurality of data values, being coupled to the delay circuit for receiving the delay signal, and being coupled to the timing control circuit for receiving the plurality of timing signals.

11. The method of claim 9 wherein the second bus cycle is consecutive in time to the first bus cycle.

12. The method of claim 9 wherein the first one of the plurality of data values is accessed during one of a read operation and a write operation.

13. The method of claim 9 wherein the first one of the plurality of address values is accessed during one of a read and a write operation.

14. A method for providing a show cycle on a multiplexed bus in a data processor, comprising the steps of:

enabling a central processing unit of the data processor to access a first data value at a first address from an internal memory of the data processor during a first bus cycle;

enabling a system integration circuit coupled to the data processor to provide the first address externally via the multiplexed bus during the first bus cycle;

enabling the system integration circuit to access a second data value at a second address during a second bus cycle;

enabling the system integration circuit to provide the second address externally via the multiplexed bus during the second bus cycle; and enabling the system integration circuit to provide the first data value externally via the multiplexed bus after the second address is externally provided during the second bus cycle.

15. A data processor, comprising:

a central processing unit for providing a plurality of control signals, a plurality of address values, and a plurality of data values; and a system integration circuit coupled to the data processor for receiving the plurality of address values, the plurality of data values, and the plurality of control values, the system integration circuit generating a first one of the plurality of control signals to indicate the data processor is operating in an emulation mode and generating a second one of the plurality of control signals to indicate when the data processor is executing a show cycle, the system integration circuit providing the plurality of address values and the plurality of data values in a first predetermined format on a multiplexed bus when the first one of the plurality of control signals indicates the data processor is operating in a first mode of operation and the second one of the plurality of control signals enable the data processor to execute the show cycle, the first predetermined format providing a first one of the plurality of data values which is associated with a first one of the plurality of addresses and which is accessed during a first bus cycle, the system integration circuit providing the first one of the plurality of data values to the multiplexed bus during a first bus cycle and during a second bus cycle in which a second one of the plurality of address values is provided to the multiplexed bus, the system integration circuit also communicating a second one of the plurality of data values which is associated with the second one of the plurality of address values to the multiplexed bus.

16. The data processor of claim 15 wherein the system integration circuit is coupled to an emulation system.

17. The data processor of claim 16 wherein the system integration circuit comprises:

a state machine for providing a plurality of state signals to control operation of the system integration circuit when the data processor is executing the show cycle, the state machine being coupled to the interface means for receiving the first one of the plurality of control signals.

18. The data processor of claim 17 wherein the bus control circuit comprises:

a timing control circuit coupled to the interface means for receiving the first one of the plurality of control signals and the second one of the plurality of control signals and coupled to the state machine for receiving the plurality of state signals, the timing control circuit providing a plurality of timing signals;

a delay circuit coupled to the interface means for receiving the first one of the plurality of control signals and the second one of the plurality of control signals and coupled to the state machine for receiving the plurality of state signals, the delay circuit providing a delay signal to indicate a timing delay operation;

a data register for selectively storing each of the plurality of data values;

an address register for selectively storing each of the plurality of address values; and a multiplexer for multiplexing each of the plurality of the data values with each of the plurality of address values to provide to provide the plurality of address values and the plurality of data values in the first predetermined format, the multiplexer being coupled to the address register for receiving the plurality of address values, being coupled to the data register for receiving the plurality of data values, being coupled to the delay circuit for receiving the delay signal, and being coupled to the timing control circuit for receiving the plurality of timing signals.

19. The data processor of claim 15 wherein the system integration circuit comprises:

interface means coupled to the central processing unit for receiving the first one of the plurality of control signals and the second one of the plurality of control signals, the plurality of address values, the plurality of data values, and the plurality of control signals; and a bus control circuit coupled to the interface means for receiving the first one of the plurality of control signals and the second one of the plurality of control signals, a plurality of address values, and a plurality of data values, the bus control circuit providing the plurality of address values and the plurality of data values in the first predetermined format.

20. The data processor of claim 15 wherein the second bus cycle is consecutive in time to the firs t bus cycle.

21. The data processor of claim 15 wherein the first one of the plurality of data values is accessed during a write operation and the second one of the plurality of data values is accessed during one of a read operation and a write operation.

22. The data processor of claim 15 wherein the first one of the plurality of address values is accessed during a write operation and the second one of the plurality of address values is accessed during one of a read or a write operation.

23. A method for providing a show cycle on a fast multiplexed bus of a data processor, comprising the steps of:

enabling a central processing unit of the data processor to provide a plurality of address values, a plurality of data values, and a plurality of control signals;

enabling a system integration circuit to provide a first one of the plurality of control signals to indicate a mode of operation of the data processor;

enabling the system integration circuit of the data processor to provide a second one of the plurality of control signals to indicate when the data processor is providing the show cycle;

enabling the system integration circuit to provide the plurality of address values and the plurality of data values in a first predetermined format on the multiplexed bus when the first one of the plurality of control signals indicate the data processor is operating in an emulation mode of operation and the second one of the plurality of control signals enable the data processor to execute the show cycle, the first predetermined format providing a first one of the plurality of data values which is associated with a first one of the plurality of address values and which is accessed during a first bus cycle, the system integration circuit providing the first one of the plurality of data values during the first bus cycle and during a second bus cycle in which a second one of the plurality of address values is provided, the system integration circuit communicating a second one of the plurality of data values associated with the second one of the plurality of address values to the multiplexed bus.

24. The method of claim 23 further comprising the steps of:

enabling an interface circuit to receive the first one of the plurality of control signals and the second one of the plurality of control signals, the plurality of address values, and the plurality of data values;

coupling a state machine to the interface circuit for receiving the first one of the plurality of control signals, the state providing a plurality of state signals to control operation of the system integration circuit when the data processor is executing the show cycle;

coupling a timing control circuit to the interface circuit for receiving the first one of the plurality of control signals and the second one of the plurality of control signals and coupled to the state machine for receiving the plurality of state signals, the timing control circuit providing a plurality of timing signals;

coupling a delay circuit to the interface circuit for receiving the first one of the plurality of control signals and the second one of the plurality of control signals and coupling the delay circuit to the state machine for receiving the plurality of state signals, the delay circuit providing a delay signal to indicate a timing delay operation;

enabling a data register to selectively store each of the plurality of data values;

enabling an address register to selectively store each of the plurality of address values; and providing a multiplexer for multiplexing each of the plurality of the data values with each of the plurality of address values to provide the plurality of address values and the plurality of data values in the first predetermined format, the multiplexer being coupled to the address register for receiving the plurality of address values, being coupled to the data register for receiving the plurality of data values, being coupled to the delay circuit for receiving the delay signal, and being coupled to the timing control circuit for receiving the plurality of timing signals.

25. The method of claim 23 wherein the second bus cycle is consecutive in time to the first bus cycle.

26. The method of claim 23 wherein the first one of the plurality of data values is accessed during a write operation and the second one of the plurality of data values is accessed during one of a read operation and a write operation.

27. The method of claim 23 wherein the first one of the plurality of address values is accessed during a read operation and the second one of the plurality of address values is accessed during a read operation and a write operation.

28. A method for providing a show cycle on a multiplexed bus in a data processor, comprising the steps of:

enabling a central processing unit of the data processor to read a first data value at a first address location from an internal memory of the data processor during a first bus cycle;

enabling a system integration circuit coupled to the data processor to provide the first address location externally via the multiplexed bus during the first bus cycle;

enabling the system integration circuit to write a second data value at a second address location from the internal memory of the data processor during a second bus cycle;

enabling the system integration circuit to provide the second address location externally via the multiplexed bus during the second bus cycle;

enabling the system integration circuit to provide the first data value externally via the multiplexed bus after the second address location is externally provided during the second bus cycle; and enabling the system integration circuit to provide the second data value externally via the multiplexed bus after the first data value is externally provided during the second bus cycle.

29. The method of claim 28 further comprising the steps of:

enabling the system integration circuit to read a third data value at a third address location from the internal memory during a third bus cycle;

enabling the system integration circuit to provide the third address location externally via the multiplexed bus during the third bus cycle;

enabling the system integration circuit to provide the second data value externally via the multiplexed bus after the third address location is externally provided during the third bus cycle; and enabling the system integration circuit to provide the third data value externally via the multiplexed bus after the second data value is externally provided during the third bus cycle.

30. The method of claim 28 further comprising the steps of:

enabling the system integration circuit to write a third data value to a third address location from the internal memory during a third bus cycle;

enabling the system integration circuit to provide the third address location externally via the multiplexed bus during the third bus cycle;

enabling the system integration circuit to provide the second data value externally via the multiplexed bus after the third address location is externally provided during the third bus cycle; and enabling the system integration circuit to provide tile third data value externally via the multiplexed bus after the second data value is externally provided during the third bus cycle.

31. The method of claim 28 wherein the first bus cycle is a read cycle and the second bus cycle is a write cycle.

32. A data processor, comprising:

a central processing unit for providing a plurality of control signals, a plurality of address values, and a plurality of data values; and a system integration circuit coupled to the data processor for receiving the plurality of address values, the plurality of data values, and the plurality of control values, the system integration circuit generating a first one of the plurality of control signals to indicate the data processor is operating in an emulation mode, the system integration circuit providing the plurality of address values and the plurality of data values in a first predetermined format on a multiplexed bus when the first one of the plurality of control signals indicates the data processor is operating in a first mode of operation, the first predetermined format providing a first one of the plurality of data values which is associated with a first one of the plurality of addresses and which is accessed during a first bus cycle, the system integration circuit providing the first one of the plurality of data values to the multiplexed bus during the first bus cycle and a second bus cycle in which a second one of the plurality of address values is provided to the multiplexed bus, the system integration circuit also communicating a second one of the plurality of data values which is associated with the second one of the plurality of address values to the multiplexed bus.

33. The data processor of claim 32 wherein the system integration circuit generates a second one of the plurality of control signals to indicate when the data processor is executing a show cycle and the system integration circuit provides the plurality of address values and the plurality of data values in a first predetermined format on a multiplexed bus when the first one of the plurality of control signals indicates the data processor is operating in a first mode of operation and the second one of the plurality of control signals enable the data processor to execute the show cycle.

34. A data processor, comprising:
   a central processing unit for providing a plurality of control signals, a plurality of address values, and a plurality of data values; and
   a system integration circuit coupled to the data processor for receiving the plurality of control signals, the plurality of address values, and the plurality of data values, the system integration circuit generating a first control signal enabling the data processor to execute a show cycle, the system integration circuit providing the plurality of address values and the plurality of data values in a first predetermined format on a multiplexed bus when the first one of the plurality of control signals indicates the data processor is executing the show cycle, the first predetermined format including a first one of the plurality of data values which is associated with a first address value and is accessed during a first bus cycles, the system integration circuit providing the first one of the plurality of data values to the multiplexed bus during a second cycle in which a second one of the plurality of address values is provided to the multiplexed bus;
   wherein the system integration circuit comprises:
      interface means coupled to the central processing unit for receiving the first one of the plurality of control signals, the plurality of address values, and the plurality of data values; and
      a bus control circuit coupled to the interface means for receiving the first one of the plurality of control signals, a plurality of address values, and a plurality of data values, the bus control circuit providing the plurality of address values and the plurality of data values in the first predetermined format.

* * * * *